United States Patent [19]
Yen

[11] Patent Number: 5,034,031
[45] Date of Patent: Jul. 23, 1991

[54] METHOD FOR VACUUM CLEANER WITH UNINTERRUPTED AND UNDIMINISHED PERFORMANCE

[76] Inventor: Richard C. K. Yen, 4261 Chase Avenue, Los Angeles, Calif. 90066

[21] Appl. No.: 572,448

[22] Filed: Aug. 27, 1990

Related U.S. Application Data

[62] Division of Ser. No. 407,414, Sep. 14, 1989, Pat. No. 4,976,758.

[51] Int. Cl.$^5$ .............................................. B01D 37/00
[52] U.S. Cl. .......................................... 55/97; 55/350; 55/429
[58] Field of Search ................... 55/97, 350, 418, 429, 55/480, 481, 482, 484, 485

[56] References Cited

U.S. PATENT DOCUMENTS

| | | | |
|---|---|---|---|
| 812,218 | 2/1906 | Lowe | 55/350 |
| 1,148,501 | 8/1915 | Collins | 55/485 |
| 1,304,681 | 5/1919 | Helmer | 55/97 |
| 1,823,693 | 9/1931 | McLaughlin et al. | 55/350 |
| 2,606,344 | 8/1952 | Clark | 55/97 |
| 3,509,967 | 5/1970 | Ballard | 55/429 |

FOREIGN PATENT DOCUMENTS

| | | | |
|---|---|---|---|
| 312274 | 5/1919 | Fed. Rep. of Germany | 55/485 |
| 54-45874 | 4/1979 | Japan | 55/350 |

*Primary Examiner*—Jay H. Woo
*Assistant Examiner*—C. Scott Bushey
*Attorney, Agent, or Firm*—Thomas I. Rozsa

[57] ABSTRACT

A vacuum cleaner assembly including a multiplicity of vacuum cleaner canister units each of which has a filter for receiving dirty fluid sucked into the canister unit and is configured such that two suction forces operate on each canister unit, with one suction force pulling fluid onto the filter and being of greater force than the second suction force pulling fluid away from the filter and pulling it out of the canister unit to an adjacent canister unit, the filter in each canister unit located in a removable compartment which can be removed when the compartment is filled with dirt, and valve means to turn off the flow into a canister unit after its compartment has been filled with dirt while permitting the vacuum cleaner to continue running and directing the flow of dirty fluid to adjacent canister units with uninterrupted and undiminished suction power.

18 Claims, 1 Drawing Sheet

METHOD FOR VACUUM CLEANER WITH UNINTERRUPTED AND UNDIMINISHED PERFORMANCE

This is a Divisional of co-pending patent application Ser. No. 07/407,414 filed Sept. 14, 1989. This application has now issued as U.S. Pat. No. 4,976,758 on Dec. 11, 1990.

BACKGROUND OF THE INVENTION

1. Field of the Invention

The present invention relates to an improved vacuum cleaning apparatus. The present invention relates to improvements wherein a vacuum cleaning apparatus does not need to be shut off in order to remove the dirt filled container and can in fact continue vacuum suction at an undiminished rate during removal of said container. The present invention further provides a multiplicity of dirt capturing chambers which can be removed sequentially without affecting the vacuuming process, thereby increasing to infinity the cleaning capacity of the vacuum cleaner system. The present invention further relates to a system for prolonging the life of the vacuum cleaner filters by reducing the amount of dirt and debris that can clog the matrix or the pores of the vacuum cleaner filter itself.

2. Description of the Prior Art

Vacuum cleaners are machines designed to suck in dirty air or other fluid containing particles for the purpose of 1) trapping the dirt or particles to be discarded and resulting in clean air or fluid to be recirculated, or 2) increasing the concentration of the particles or contaminants suspended in air or other fluids for further forensic, medical or chemical analysis, or recycle. For these purposes a vacuum cleaner typically consists of 1) an inlet hose where the air or fluid is sucked in, 2) a filter bag or & filtration means with effective pore sizes suitable for separation of the particles from the surrounding fluid phase. After separation, the separated particles would be retained within the interior of the filter bag. 3) a motor usually behind the filtration means to draw the dirty air or particle suspension into the inlet hose and through the filtration means, after which the cleaned air or fluid leaves the vacuum cleaner, and 4) a rigid housing for the filtration means and the motor and connection to the inlet hose.

However, conventional vacuum cleaners have several major problems. 1) As soon as the filtration means starts to work, separating the particles from the fluids by means of trapping the particles via the pores of the filter, the number of pores effective for further filtration decreases. This means the efficiency of filtration drastically decreases even though the motor is working at maximum power. 2) As the filter bag or filtration means gets clogged up, it has to be changed, cleaned or discarded. This not only involves the cost of the bag but requires interruption of the vacuuming process. In many situations even temporary termination of the suction process is not desirable. For example, in large built-in vacuum systems such as for use in hospitals or in organic farming (e.g. to remove caterpillars and insects from lettuce) where many workers over a wide area need constant vacuum power at all times, the motor simply cannot be turned off for the purpose of changing filled up filter bags. 3) When the motor needs to be turned off for the purpose of changing filter bags, no matter how temporary, part of the contaminant may become loosened from the filter surface and recirculate back to the open air because there is no pressure at the time to keep the dirt onto the surface of the filter. In the cement or other construction material manufacturing industry where light powder-like material is involved, this means the workers will have to wear masks to prevent breathing in the particles during the changing of filter bags. In hospital settings, where viral particles or other infectious diseases abound, rebreathing of concentrated infectious agents is a distinct occupational and health hazard. Ideally, the filled bags should be changed with the motor still on and filtering can go on without leakage and exposure to the workers involved. 4) The filtrating process of most vacuum cleaners will trap most of the particles within the matrix or pores of the filters. This is not desirable if the purpose of filtration is to recover, not to discard, the particles for further analysis. The reason is because most of the material cannot be recovered from the filter matrix. In addition, for materials that are sensitive to compacting pressure, the positive pressure pressing the particles into the retention surface of the filter may denature them and change their properties. Positive pressure here is defined as a pressure in the direction towards the retention surface of the filter. Positive pressure tends to bring the particles towards the filter and press them against the retention surface of the filter. With this definition, a "vacuum" source (defined as pressure less than atmospheric pressure) drawing dirty air towards the interior surface of a vacuum cleaner filter bag actually exerts a positive pressure on the retention surface of the filter bag. The retention surface of a filter is defined as the surface that faces the material or fluid suspension to be filtered and is the surface facing away from the filtered clean fluid. The interior surface of the vacuum cleaner filter bag for example is the retention surface. For the purpose of simplicity here, we will define as particles any molecules or aggregates whether in dissolved state, solid state or colloidal state, which are dissolved or suspended in a fluid phase, liquid or gaseous, and which can be retained by a filtration means.

Therefore, there exists a need for a vacuuming machine that 1) does not decrease efficiency with use; 2) does not require turning off of the motor for changing filled up bags; 3) prevents recirculation of filtered particles back to the environment; and 4) does not excessively compact or denature the material to be filtered.

Several methods have been attempted, often with unsatisfactory results, to overcome the problems mentioned above.

To overcome the decreased efficiency of one filter bag, several approaches were used:

1. Conventional pre-filters have been used to screen out large particles by virtue of pre-filters with pore sizes much larger than the pore sizes of the filter bag in the vacuum cleaner. The idea is to presieve the material so that only particles of the appropriate size (e.g. dust) for filtration is presented to the filter bag of the vacuum cleaner. Also the load presented for the vacuum cleaner is decreased (e.g. rocks and stones have been removed by the pre-filter). The problems of such an approach are that such pre-filters can clog, and when they clog, even the smaller particles cannot go through to reach the vacuum cleaner. So in reality, such an arrangement is merely utilizing two filters of different sizes in tandem and employing positive pressure (although by a single motor generating a "vacuum source") to filter particles of different sizes.

Even if large particles are pre-filtered out, the small particles can still clog the filter bag of the vacuum cleaner and decrease its efficiency.

2) To promote detachment of clogging materials from the vacuum cleaner filter, some vacuum cleaners are designed with the inlet hose connected near the bottom of the vacuum cleaner unit and the filter fixed at the top so that the movement of dirty air is from bottom to top inside the unit and the clean air then exists near the top of the unit. The idea is to promote detachment of the filtered dirt from the filter means by virtue of gravitational force. It is hoped that when the motor is turned off, the dust particles will fall off the filter means back to the bottom, to be removed at some time later. The filter may or may not need to be removed or changed every time. The disadvantages are: 1) when the motor is turned on, the particles coming from the inlet hose as well as those that have detached and fallen off from previous suction will both clog the filter again; 2) gravitational force will only detach high density particles (e.g. rocks) which normally is not the main obstructive particles of the filter means; 3) removal of filtered material requires turning off the motor and interruption of the vacuuming process; 4) detachment, if any, of the filtered dust from the fixed filter means by gravity promotes dispersion of the dust particles within the storage compartment and therefore when the compartment is opened for removal of dirt, contamination of the environment will result; 5) such prior art uses unopposed positive pressure which tends to compact the particles collected, and is not suitable if the purpose of the filtration is to collect and concentrate particles for further analysis without changing their physical properties.

3) The inventor, Dr. Richard Yen, has filed a copending patent application entitled "Prefilter For Vacuum Cleaners", Ser. No. 07/335876 filed on Apr. 10, 1989. This application has now issued as U.S. Pat. No. 4,906,259 on Mar. 6, 1990. The inventor's previous patent application of a self-cleaning pre-filter employed a different method which is useful for particles that tend to stick to each other. The principle utilized negative pressures to draw the sticky particles away from the pre-filter surfaces. By using a strong negative pressure, the particles are actually detached or anti-clogged from the pre-filter while they are being concentrated. The concentrating effect promotes aggregation. By allowing a long enough passage in the pre-filter system before the particles reach the main filter bag of the vacuum cleaner, the aggregation of the particles will have resulted in the formation of bigger particles too large to effectively clog the pores of the filter bag of the vacuum cleaner. The idea of such a pre-filter is new in that 1) it does not require the pre-filter to have a particular pore size as compared to the size of the vacuum cleaner filter bag (i.e. does not have to be larger or smaller), 2) the pre-filter is self-cleaned and designed not to trap any particles, 3) the pre-filter utilizes a negative pressure greater than the positive pressure at sites on the pre-filter surfaces where the tendency to clog is greatest, 4) the pre-filter serves to concentrate particles that have a tendency to aggregate into larger particles.

However, for application in situations where the particles do not tend to aggregate, such as 1) dry powder (as opposed to wet powder), or 2) particles with electric charges in the surface that repel each other, or 3) smooth and hard surfaces, or 4) light density and small particles that keep floating and not settling with time; a new design of the vacuum cleaner itself must also be considered. The present application is a novel design of the vacuum cleaner, and can be used in conjunction with, or in the absence of, the inventor's previous invention of a self-cleaning pre-filter or any other pre-filters.

SUMMARY OF THE PRESENT INVENTION

A multi-compartment vacuuming machine which maintains 1) an undiminishing flow rate at the inlet hose; 2) and allows removal of filled up filtered bags without turning off the motor and without loss of trapped material back to the environment, and 3) which uses some negative pressure to counteract the positive pressure used to collect the particles within the filter bags of the vacuum cleaner.

The present invention is a vacuum cleaner assembly comprising a multiplicity of vacuum cleaner canister units each of which comprises a filter for receiving dirty air sucked into the canister unit and is configured such that two suction forces operate on each canister unit, with one suction force pulling air onto the filter and being of greater force than the second suction force pulling air away from the filter and forcing it out of the canister unit to an adjacent canister unit, the filter in each canister unit located in a removable compartment which can be removed when the compartment is filled with dirt, and valve means to turn off the flow into a canister unit after its compartment has been filled with dirt while permitting the vacuum cleaner to continue running and directing the flow of dirty air to adjacent canister units.

It has been discovered, according to the present invention, that if a multiplicity of canisters are aligned in series and connected in series through an air flow hose, with each canister having an inlet port and two outlet ports, and the canister further comprises an internal filter means with one outlet port located so as to draw air toward the filter means and a second outlet port located so as to draw air away from the filter means, then the configuration of the ports including size and proximity to the source of suction can be configured to draw most of the air onto the filter means while enabling some of the air to be removed from the filter means to unclog the pores and maintain the suction process continuously.

It has further been discovered, according to the present invention, that if there are at least three such canisters aligned in series, then when the first canister has been filled with dirt and debris, the dirt collection portion of the first canister adjacent the filter means can be removed while the air is channeled to the second canister through appropriate valve arrangements to thereby maintain the vacuum cleaner suction while the filled first canister is being cleaned and any residual flow can be channeled to the third canister.

It has additionally been discovered, according to the present invention, that the combination of a strong positive pressure to suck dirty air onto a filter combined with a weaker negative pressure to suck the air away from the filter surface provides a means to maintain the filter in an unclogged position for as long as possible before it is necessary to clean the canister and filter.

It is therefore an object of the present invention to provide a vacuum cleaning system which has a continuous source of vacuum to maintain the cleaning effect even while a portion of the vacuum cleaner is being cleaned to remove debris from one of the vacuum cleaner canisters.

It is a further object of the present invention to maintain a positive pressure of dirty air flow against a filter in the vacuum cleaner at all times to prevent recirculation of particles back to the environment when changing bags.

It is an additional object of the present invention to maintain a constant maximal flow rate of vacuum cleaner suction regardless cf the performance of the first filter in the first canister which becomes filled most rapidly.

Further novel features and other objects of the present invention will become apparent from the following detailed description, discussion and the appended claims, taken in conjunction with the drawings.

BRIEF DESCRIPTION OF THE DRAWINGS

Referring particularly to the drawing for the purpose of illustration only and not limitation, there is illustrated.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
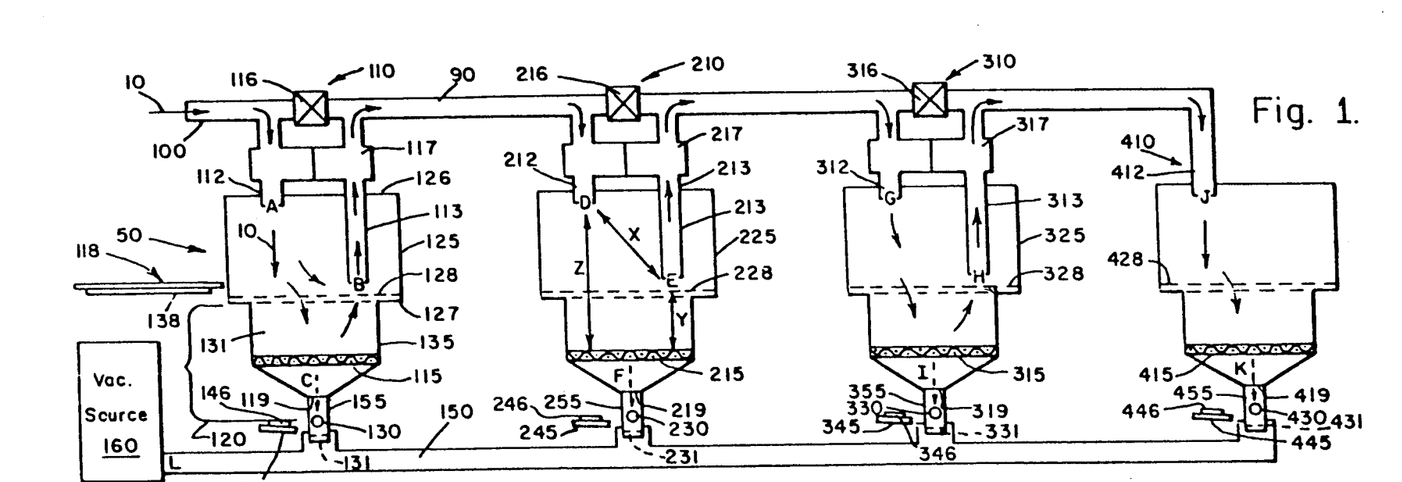
FIG. 1 is a schematic flow diagram of the present invention vacuum cleaner with uninterrupted and undiminished performance, illustrating the general configuration of the apparatus and further illustrating the principles by which the present invention operates, with the valves oriented to create an air flow into the first vacuum cleaner chamber and the remaining vacuum cleaner chambers.
Figure 2:
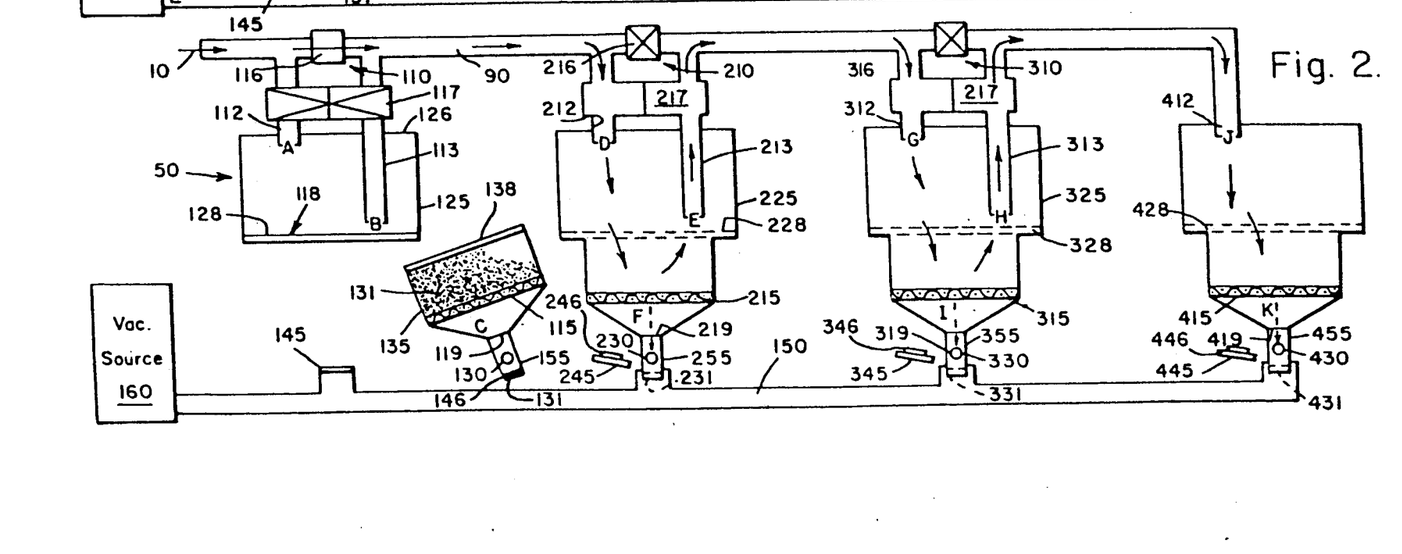
FIG. 2 is a schematic flow diagram of the present invention vacuum cleaner with uninterrupted and undiminished performance, illustrating the general configuration of the apparatus and further illustrating the principles by which the present invention operates, with the valves oriented to stop a flow into the first vacuum cleaner chamber so that the dirt receptacle may be removed from the chamber while the air flow is directed to the second chamber and remaining vacuum cleaner chambers.

The present invention comprises any multiplicity of vacuum cleaner canisters aligned in series so that air which comprises dirt and dust particles or other debris to be removed first flows through the first canister and thereafter sequentially flows through each succeeding canister. By way of illustration, the embodiment in FIGS. 1 and 2 illustrates four such vacuum cleaner canisters in series but it emphasized that the present invention is operative with at least three such vacuum cleaner canisters. Referring to FIG. 1, vacuum cleaner canisters 110, 210, 310 and 410 are aligned in series. Dirty fluid 10 is sucked into dirty fluid inlet hose 100 via a conventional means such as a vacuum cleaner suction brush, etc. and enters the present invention vacuum cleaner 50 through the dirty fluid inlet hose 100. The multiplicity of vacuum cleaner canisters are connected by canister connection hose 90. Passage of air 10 through the canister connection hose 90 is regulated by a series of valves, one located adjacent each respective canister. Valve 116 is located in canister connection hose 90 adjacent canister 110. Valve 216 is located in canister connection hose 90 adjacent canister 210. Valve 316 is located in canister connection hose 90 adjacent canister 310. When the valves 116, 216 and 316 are in the closed position as illustrated in FIG. 1, air 10 is prevented from flowing through canister connection hose 90 and instead is directed to flow into the respective canister 110, 210, 310 and 410. Air 10 can flow through the canister connection hose 90 for the distance between the outlet from one canister to the inlet of the second canister.

Canister 110 comprises an inlet hose 112 and an exit hose 113. Air flow through the inlet hose 112 and exit hose 113 is regulated by valve 117. When valve 117 is in the opened position, air can flow into the canister 110 through inlet hose 112 and air can exit the canister through exit hose 113. Valve 117 simultaneously opens and closes both the inlet hose 112 and the exit hose 113. When valve 117 is in the closed position, air cannot enter or exit canister 110. Canister 110 further comprises a fixed canister body 125 into which inlet hose 112 and exit hose 113 are inserted. Inlet hose 112 terminates within fixed canister body 125 adjacent the top 126 of fixed canister body 125. Air exit hose 113 begins adjacent the bottom 127 of fixed canister body 125 and extends through the top 126 and into canister connection hose 90. The interior wall of fixed canister body 125 is filled with a slot 128 to accommodate the double closure plate 118. The double closure plate 118 is shown to one side of the fixed canister body 125 in FIG. 1. It will be appreciated that this double closure plate 118 is normally in a position remote from the vacuum cleaner 50.

Set below fixed canister body 125 and connected to it and in fluid communication with it is removable canister body 135. As illustrated by the air flow arrows 10, air can flow from the fixed canister body 125 into the removable canister body 135. Removable canister body 135 further comprises an internal filter 115 which stretches across the entire interior cross-section of removable canister body 135. The bottom of removable canister body 135 comprises an opening 119 which is connected to suction source hose 150 which in turn is connected to vacuum suction source 160. A flow meter 130 is located adjacent opening 119 within the connector hose 155 leading from opening 119 to the suction source hose 150.

It will be appreciated that each of the remaining cannisters 210 and 310 are configured similarly to the configuration just described for canister 110.

The present invention works pursuant to the following equations:

1. Flow is equal to the Pressure divided by the Resistance:

Flow = Pressure/Resistance

2. Resistance is proportional to the Length of the Tube divided by the Radius of the Tube to the fourth power:

Resistance α Length of Tube/(Radius of Tube)

The present invention works pursuant to the following principles. The source of suction 160 creates a suction force pulling air 10 in through inlet hose 100, and pulling air 10 into the fixed canister body 125 through inlet hose 112. Once inside fixed canister body 125, a portion of the air is sucked into removable canister body 135, onto the filter member 115, out opening 119 into connector hose 155, into suction source hose 150 and to the source of suction 160. A second portion of the air is sucked into exit opening 113 and into the portion of canister connector hose 90 between first canister member 110 and second canister member 210 where the cycle is repeated in second canister 210.

The first important principle of the present invention is that opening 119 and connecting hose 155 at the bottom of removable canister body 135 have a larger diameter than exit hose 113 thereby causing a suction pressure on the air 10 toward opening 119 which is greater than the suction pressure on the air 10 at the opening of exit hose 113. Therefore, by the previously set forth definitions, the positive pressure on the filter 115 created at location "C" is greater than the negative pressure away from the filter 115 created at location B.

The second important principle is that the length of the pathway from location B (adjacent the opening of exit tube 113) via canister 210, 310, 410 to location L (adjacent the source of suction 160) is greater than the length of the pathway from location C (adjacent opening 119) to location L. Therefore, the resistance to air flow at the start of suction at location C is less than the resistance to air flow at location B thereby creating more flow through filter 115 than away from filter 115.

Distances X, Y and Z have been drawn in canister 210 but also apply to each canister. Distance X is the distance from location A at the opening of inlet hose 112 to location B at the opening of exit hose 113. It is important that the distance X be of sufficient length to separate locations A and B so that air 10 will not go immediately from the inlet hose 112 to the exit hose 113. The extent to which particles exit through location B also depends on the positive pressure at filter 115, location C. Distance Z is the distance from the opening of inlet hose 112 to filter 115. Distance Y is the distance from the opening of exit hose 113 to filter 115. It is preferred that the distance Z be greater than the distance Y so that dirt and other debris particles 131 can collect above filter 115 within removable canister body 135 without obstructing the inflow of air 10 via hose 112. In this manner, when the removable canister body 135 becomes progressively filled with dirt and debris 131, some of the dirt and dust particles 131 will be carried with air 10 through exit hose 113 and into second canister 210. This will prevent dirt from piling up above slot 128 and occluding the opening of exit hose 113. In the non-preferred embodiment, distance Z can be shorter than distance Y. Again, when the level of dirt reaches above slot 128, it will obstruct the inlet 112. The lowest point along distance Z or Y will influence the capacity of the removable canister 135 to house collected debris 131, and therefore must be of a distance above slot 128 to allow adequate inlet and outlet of dirty fluid.

When the vacuum cleaner 50 is first turned on, all filters (115, 215, 315 etc.) in each canister are clean. In canister 110, positive pressure onto filter 115 is greater than negative pressure away from filter 115 since the resistance to air flow via openings 119 and of connector hose 155 is less than the resistance to air flow via exit hose 113. Therefore, dirt and debris 131 accumulates onto filter 115. As dirt and therefore resistance builds up at the retention surface of filter 115, flow of air 10 onto the filter surface decreases and therefore flow of air or fluid away from the filter surface and out through exit hose 113 increases. Air which passes through the filter 115 and goes to location C and therefore out opening 119 is clean air. Air which goes to location B and out exit hose 113 is dirty air. As the debris 131 on filter 115 builds up, proportionally more air 10 goes to location B and out exit hose 113 creating more negative pressure on the filter 115. As the ratio of negative pressure to positive pressure in vacuum canister 110 increases due to the accumulation of dirt and debris on the retention surface of filter 115, the following will occur: 1) some dirt will be lifted off the filter retention surface when the negative pressure becomes greater than the positive pressure; 2) some clogged filter pores become unclogged. As some clogged filter pores become unclogged due to the negative pressure the following will result: 1) less compaction of collected particles, allowing more flow through the collected particles; and 2) partial restoration of the filtration efficiency of filter 115 by re-opening some clogged pores. Therefore, the negative pressure and positive pressure fluctuates within vacuum section 110, always with the result of promoting filtration through filter 115.

In the preferred embodiment, a flow meter 130 is positioned in connector hose 155 to provide a visual observation of the flow of air going through connector hose 55. In the preferred embodiment, removable canister body 135 is made of transparent material so that the collection of dirt and debris 131 can be visually seen. Referring to FIG. 2, when removable canister body 135 is filled with dirt and debris 131 as determined by a visual inspection or reading the flow meter 130, valve 116 is opened and simultaneously valve 117 is closed. Double lid 118 is slid into grooves 128 and removable canister body 135 is removed from fixed canister body 125. One part of double lid 118 will seal off bottom opening of fixed canister body 125 while the other part of 118 i.e. 138 will seal off top opening of removal canister body 135. The fixed canister body 125 and removable canister body 135 can be connected through any desired conventional means such as a press fit, a threaded arrangement, etc. Lid 138 will prevent collected dirt from escaping into air when removable canister body 135 is removed. With valve 117 closed, dirty air bypasses vacuum canister 110 and goes directly to vacuum canister 210, moving along canister connection hose 90 and entering fixed canister body 225 through inlet hose 212 at location D. As illustrated in FIG. 2, only valve 116 is opened and valves 216, 316 etc. remain closed. Similarly, only valve 117 is closed and valves 217, 317 etc. remain open.

Therefore, through the present invention, suction power of vacuum source 160 is always at its maximum because to the extend that filter 115 is not working with maximum efficiency, negative pressure in vacuum canister 110 will direct air through opening location B in exit hose 113 to vacuum canister 210, from there to 310 when filter 215 is not working at maximum efficiency, etc.

In the preferred embodiment, the resistance of the system is initially arranged such that flow rate through various parts are for illustration purposes, approximately as follows:

| Location | Flow Rate |
|---|---|
| A | 100 Liters/minute |
| B | 10 Liters/minute |
| C | 90 Liters/minute |
| D | 10 Liters/minute |
| E | 1 Liter/minute |
| F | 9 Liters/minute |
| G | 1 Liter/minute |
| H | 0.1 Liter/minute |
| I | 0.9 Liter/minute |
| J | 0.1 Liter/minute |
| K | 0.1 Liter/minute |
| L | 100 Liters/minute = (90 + 9 + 0.9 + 0.1) |

Therefore flow at inlet 100 always equals to flow at L.

When filter 115 becomes partially obstructed, for example, flow at location C is decreased to 50 Liters/minute, the flow at location B will increase to approximately 50 Liters/minute because the flow of air is now shifted from location C to locations F, I and K. The sum of the flow at locations F, I and K will have increased from 10 Liters/minute (9+0.9+0.1) to 50 Liters/minutes. Since the first effective canister that the dirty air will encounter will handle approximately 10 times the flow compared to the next canister downstream, vacuum canister 210 will handle approximately 45 Liters/minute through location F and approximately 5 Liters/minute through location E. Now the flow of air passing through location L is the sum of 50 Liters/minute (from location C), 45 Liters/minute (from location F), 4.5 Liters/minute from location I and 0.5 Liters/minute from location K, which still totals 100 Liters/minute.

Again, flow at inlet 100=flow at L.

When filter 115 becomes completely obstructed and valve 117 is closed while valve 116 is open, the flow will be as follows:

| Location | Flow Rate |
|---|---|
| A | 0 Liters/minute |
| B | 0 Liters/minute |
| C | 0 Liters/minute |
| D | 100 Liters/minute |
| E | 10 Liter/minute |
| F | 90 Liters/minute |
| G | 10 Liter/minute |
| H | 1 Liter/minute |
| I | 9 Liters/minute |
| J | 1 Liter/minute |
| K | 1 Liter/minute |
| L | 100 Liters/minute ( 0 + 90 + 9.0 + 1) |

Again, flow at inlet 100=flow at L.

The number of canisters to be used is unlimited but must be equal to three (3) or more; ar least two (2) to allow shifting of positive pressure from first to second filter means and at least one (1) for terminal trapping of residual dirt (vacuum canister 410). The sum of the dirt collection capacities of all canisters should exceed the expected actual compacted (not dispersed) volume of dirt or particles to be filtered or collected.

As illustrated in FIG. 1, the final vacuum canister 410 does not have an exit hose but instead all of the air flow goes through the filter 415 and out opening 419 to suction hose 150. In addition, before the removable canister 65 body 135 is removed, a double port cover 145 is placed over the opening (similar to the effect of double lid 118) connecting connector hose 155 to suction hose 150 so that dirt will not escape from removable canister 135 and also suction pressure will not be lost along hose 150. Specifically, connector hose 130 further comprises a slot 131 to receive the upper portion 146 of double lid 145 while the remainder of double lid 145 closes off the opening of the suction hose 150 into which the connector hose 130 was inserted. There are comparable slots and double lids with upper portions in the remaining vacumm units, sequentioally numbered as 231, 331, 431 and 245, 345 and 445, and 246, 346, and 446, respectively.

A comparison illustrating the differences between the present invention and the invention disclosed and claimed in the inventor's co-pending application entitled "Pre-filter For Vacuum Cleaners", Ser. No. 07/335876 filed on Apr. 10, 1989 ("'876 Application") is set forth in the following comparison chart:

| '876 Application | Present Invention |
|---|---|
| 1. A pre-filter for use in conjunction with conventional vacuum cleaner. | 1. A vacuuming machine. Not a pre-filter. Can use any pre-filter, but is not required to use any. |
| 2. Filtration means of pre-filter to be kept clean by negative pressure. | 2. Filtration means will trap dirt and become dirty. |
| 3. Filtration means not meant to be discarded. | 3. Filtration means meant to be discarded. |
| 4. Negative pressure designed to be always greater than positive pressure within locations of pre-filter where clogging occurs. | 4. Positive pressure is designed to be greater than negative pressure in canisters effectively filtering dirt. |
| 5. Long pathway desirable for particles to aggregate. | 5. Short pathway desirable to decrease resistance to flow. |
| 6. Works best with sticky particles. | 6. Works with any particles. |
| 7. Dirt collected at the end or beyond the end of pre-filter. | 7. Dirt collected at the first canister preferentially. |
| 8. Main vacuum cleaner filter bag will eventually fill up. | 8. If first filled canister is replaced before second canister is filled up, there will always be a functional filtration means doing the filtration. |
| 9. Particles will be compacted at collection site i.e. vacuum cleaner bag, because unopposed positive pressure is applied to particles against filter surface there. | 9. Reduced likelihood of compaction because negative pressure becomes greater to unclog pores when particles begin to obstruct pores because of positive pressure. |
| 10. Requires turning off motor to change filled bag. | 10. Motor can remain on at all times. |
| 11. Difficult to control recirculation of particles back to environment when changing filled bags. | 11. When changing canisters, positive pressure present at all times to prevent recirculation of particles back to environment and the lids are applied before one removable canister is detached from fixed canister. |
| 12. No shifting of pressures expected between sub-units of pre-filter. | 12. Shifting of suction power to next canister when one filter decreases efficiency |
| 13. Flow of dirty air at inlet will decrease when conventional vacuum cleaner bag becomes filled. | 13. Constant maximal flow rate at inlet hose regardless of the performance of first |

| '876 Application | Present Invention |
|---|---|
| | filter in first canister. |

Therefore, the present invention is a vacuum cleaner comprising:

a. a multiplicity of vacuum canisters connected to each other in series;

b. the first of said multiplicity of vacuum canisters further comprising:

(i) a fixed canister body, (ii) a removable canister body removably connected to the lower end of said fixed canister body and in fluid communication therewith, (iii) an inlet hose connecting the dirty fluid inlet hose to the interior of the fixed canister body, (iv) an exit hose extending from within the fixed canister body to a canister connection hose which connects the first of said multiplicity of canisters to the inlet hose of the next in the series of said multiplicity of canisters, (v) a filter extending across the interior of the removable canister body, (vi) the lower end of the removable canister body terminating in an opening, (vii) a connector hose connecting the opening in the bottom of the removable canister body to a suction source hose which in turn is connected to a source of suction, the resistance to fluid flow of the connector hose and the opening in the bottom of the removable canister body being less than the resistance to fluid flow of the exit hose;

(viii) a double lid, one part of which is placed over the removable canister body after it is filled with debris and before it is removed from the fixed canister body, and the other part inserted into a slot in the fixed canister body to cover the opening of the fixed canister body before the removable canister body is detached;

c. each successive vacuum canister in the series except for the last vacuum canister configured identical to the first vacuum canister, with the respective connector hose leading from the opening at the bottom of respective removable canister body connected to the same source of suction through the suction source hose, the exit hose of one canister leading to a portion of the vacuum connector hose which is connected to the inlet hose of the next successive canister;

d. a first on-off valve located along the vacuum connector hose adjacent each respective vacuum canister;

e. a second on-off valve located along the inlet hose and exit hose of each respective vacuum canister;

f. the last of said multiplicity of vacuum canisters in the series further comprising:

(i) a fixed canister body, (ii) a removable canister body removably connected to the lower end of said fixed canister body and in fluid communication therewith, (iii) an inlet hose connecting the portion of the vacuum connector hose leading from the exit hose of the next to last vacuum canister to the interior of the fixed canister body, (iv) a filter extending across the interior of the removable canister body, (v) the lower end of the removable canister body terminating in an opening, (vi) a connector hose connecting the opening in the bottom of the removable canister body to a suction source hose which in turn is connected to the source of suction; and (vii) a double lid, one part of which is placed over the removable canister body after it is filled with debris and before it is removed from the fixed canister body, and the other part inserted into a slot in the fixed canister body to cover the opening of the fixed canister body before the removable canister body is detached;

g. whereby all first valves are initially closed and all second valves are initially open and the source of suction generates a greater suction force on the first canister in the series than in the remaining canisters so that the first removable canister is filled with dirt and debris first and the source of suction generates a greater suction force through the opening in the bottom of each removable canister body than through the exit hose in each fixed canister body wherein a greater positive pressure is exerted causing debris to form adjacent and above the filter in each removable canister body while a negative pressure on the filter from the suction through the exit hose serves to remove some particles which are entraped in the filter and provide it with a longer cleaning life, and at such time as the first removable canister is filled with debris, the first valve adjacent a first vacuum canister is opened and the second valve adjacent the first vacuum canister is closed to close off the inlet hose and exit hose of the first vacuum canister and the removable canister body of the first vacuum canister is removed to discard debris while the vacuum cleaner is still running.

Defined more broadly, the present invention is a vacuum cleaner comprising: (a) a multiplicity of vacuum canisters connected to each other in series by a vacuum connector hose; (b) each of the vacuum canisters except the last canister comprising an inlet hose and an exit hose for permitting air to enter and leave the internal canister chamber, with the exit hose from one vacuum canister connected to a portion of the vacuum connector hose leading to the inlet hose of the next vacuum canister in the series; (c) the last vacuum canister in the series comprising an inlet hose to permit air to enter the internal canister chamber; (d) each of the vacuum canisters further comprising an internal filter contained within a removable portion of the vacuum canister, the filter adjacent an opening which is connected through a hose to a vacuum suction source; (e) a double lid, with one part of the lid to be placed over the removable portion of the vacuum canister when it is filled with debris and before removal of the canister, and the other part of the lid to be placed within a slot in the non-removable portion of the canister; (f) the resistance to fluid flow of each opening connected through a hose to the vacuum suction source is less than the resistance to fluid flow of the respective exit hose in that vacuum canister such that the suction force generated through the opening to pull air onto the filter is greater than the suction force generated through the exit hose to pull air away from the filter; (g) a first on-off valve located along the vacuum connector hose adjacent each respective vacuum canister; and (h) a second on-off valve located along the inlet hose and exit hose of each respective vacuum canister.

The present invention is also a method of vacuum cleaning or fluid filtration whereby an uninterrupted and undiminished suction efficiency is possible.

To permit vacuum suction without interruption regardless of the amount of fluid to be vacuum-cleaned or filtered, the present method utilized a series of canisters whereby the first in the series will collect the dust or particles and get filled up before the next canister in the series begins to function as a filtering and containment apparatus. This process is possible by virtue of an automatic and continuous shifting of the balance between positive pressure pushing the fluid (and the debris carried by the fluid) onto the filter versus the negative pressure pulling the fluid (and the debris carried by the fluid) away from the filter. When the filter is clean, the flow of fluid tends to go towards the retention surface of the filter instead of moving away from it. As the resistance of the filter goes up, either by its pores being clogged by the particles, or by virtue of the amount of dirt piled on top of it, the flow of fluid begins to increasingly flow through the exit hose to the next canister. This automatic shifting of the balance between positive pressure and negative pressure in a canister allows the filter to be maximally useful before the debris is shifted to the next canister in series where that next filter is clean. The tendency of the debris to clog the filter (by virtue of its size or stickiness to the pores of the filter, or by virtue of their obstruction as a thick layer on top of the filter, preventing fluid and other particles penetrating through them to reach to the filter) determines when this shifting of flow through the filter verses away from the filter occurs. Therefore, this system automatically optimizes the performance of the filters regardless of what debris is to be filtered. In addition, since a multiplicity of canisters can be connected to the system, and since filled up canisters can be removed while the next canister in series is operating, this system can be made to perform with an infinite capacity as long as filled up canisters are replaced with clean canisters with clean filters before it is their turn to function as debris filtration and debris receptacles.

This method is also a method to improve the filtration efficiency of the filter. One major resistance to the efficiency of the filter is the amount of dirt piled on top of the filter. While the pores of the filter are not necessarily clogged, the dirt on top of the filter forms a barrier to fluid flow toward the filter: the more compact the layer, the greater the resistance to fluid flow through it. Conventional methods used un-opposed positive pressure which tends to compact the dirt layer until all flow through it becomes negligible. The present method allows an increasingly large competing negative pressure to loosen this dirt layer so that channels of flow are created to allow the fluid to reach to the filter whose pores are not necessarily clogged. At any time the dirt layers becomes more resistant to flow through it (either by the stickiness or the amount of the material, or by shaking of the canister by external force), the flow of fluid away from the dirt pile is increased, thus decreasing the load onto the dirt pile and at the same time increasing the negative pressure to loosen the dirt layer. This approach is particularly important if the debris or particles are pressure-sensitive and will be used subsequently for further analysis on other applications.

The present invention is also a method to allow suction and filtration to proceed with undiminished power. This result is possible because of the shifting of filtration from a site which begins to obstruct to a new site where obstruction is not yet a problem. Thus it is analogous to a continuous process of replacing every obstructed area of a filter with an equivalent area of unobstructed filter means. This allows the suction means to operate at maximal efficiency at all times instead of maximal efficiency only at the initial time and at much diminished efficiency during the remainder of the filtration time.

The present invention is also a method to keep the filtered particles from escaping into the air by enclosing them in a removable canister in the presence of continuous suction without having to turn off the suction source during change of the filter means enclosed inside the removable canister.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A method of filtering fluid including debris comprising:
   a. causing said fluid to pass through a mulitplicity of filtering canisters aligned in series including a first and a second filtering canister, such that the first filtering canister will collect debris particles in the fluid and become filled with debris before the second filtering canister begins to function as a filtering apparatus; and
   b. removing one of the filtering canisters in the series which has become filled with debris while enabling the filtering to continue through the remaining filtering canisters without stopping the filtering process.

2. The method in accordance with claim 1 further comprising automatic and continuous shifting of a balance between positive pressure pushing the fluid onto the filter of each filtering canister and negative pressure pulling the fluid away from the filter of each filtering canister, such that when the filter of the first filtering canister is clean, the positive pressure pushing the fluid onto the filter exceeds the negative pressure and as the filter becomes clogged with debris, the negative pressure exceeds the positive pressure and causes the fluid to travel to the filter of the filtering canister next in the series.

3. The method in accordance with claim 2, wherein the negative pressure pulling the fluid away from the filter in each filtering canister loosens the debris formed on each filter so that the channels of flow are created to allow the fluid to reach to the filter whose pores are not completely clogged.

4. A method of filtering fluid including debris comprising:
   a. causing said fluid to pass through a multiplicity of filtering canisters aligned in series including a first and a second filtering canister, such that the first filtering canister will collect debris particles in the fluid and become filled with debris before the second filtering canister begins to function as a filtering apparatus; and b. replacing one of the filtering canisters in the series which has become filled with debris while enabling the filtering to continue through the remaining filtering canisters without stopping the filtering process.

5. The method in accordance with claim 4 further comprising automatic and continuous shifting of a balance between positive pressure pushing the fluid onto the filter of each filtering canister and negative pressure pulling the fluid away from the filter of each filtering canister, such that when the filter of the first filtering canister is clean, the positive pressure pushing the fluid onto the filter exceeds the negative pressure and as the filter becomes clogged with debris, the negative pressure exceeds the positive pressure and causes the fluid to travel to the filter of the filtering canister next in the series.

6. The method in accordance with claim 5, wherein the negative pressure pulling the fluid away from the filter in each filtering canister loosens the debris formed on each filter so that the channels of flow are created to allow the fluid to reach to the filter whose pores are not completely clogged.

7. A method of filtering fluid including debris comprising:
   a. causing said fluid to pass through a multiplicity of filtering canisters aligned in series such that a given one of the filtering canisters will collect debris particles in the fluid and become filled with debris before a next filtering canister begins to function as a filtering apparatus; and
   b. removing one of the filtering canisters in the series which has become filled with debris while enabling the filtering to continue through the remaining filtering canisters without stopping the filtering process.

8. The method in accordance with claim 7 further comprising automatic and continuous shifting of a balance between positive pressure pushing the fluid onto the filter of each filtering canister and negative pressure pulling the fluid away from the filter of each filtering canister, such that when the filter of the first filtering canister is clean, the positive pressure pushing the fluid onto the filter exceeds the negative pressure and as the filter becomes clogged with debris, the negative pressure exceeds the positive pressure and causes the fluid to travel to the filter of the filtering canister next in the series.

9. The method in accordance with claim 8, wherein the negative pressure pulling the fluid away from the filter in each filtering canister loosens the debris formed on each filter so that the channels of flow are created to allow the fluid to reach to the filter whose pores are not completely clogged.

10. A method of filtering fluid including debris comprising:
    a. causing said fluid to pass through a multiplicity of filtering canisters aligned in series such that a given one of the filtering canisters will collect debris particles in the fluid and become filled with debris before a next filtering canister begins to function as a filtering apparatus; and
    b. replacing one of the filtering canisters in the series which has become filled with debris while enabling the filtering to continue through the remaining filtering canisters without stopping the filtering process.

11. The method in accordance with claim 10 further comprising automatic and continuous shifting of a balance between positive pressure pushing the fluid onto the filter of each filtering canister and negative pressure pulling the fluid away from the filter of each filtering canister, such that when the filter of said first filtering canister is clean, the positive pressure pushing the fluid onto the filter exceeds the negative pressure and as the filter becomes clogged with debris, the negative pressure exceeds the positive pressure and causes the fluid to travel to the filter of the filtering canister next in the series.

12. The method in accordance with claim 11, wherein the negative pressure pulling the fluid away from the filter in each filtering canister loosens the debris formed on each filter so that the channels of flow are created to allow the fluid to reach to the filter whose pores are not completely clogged.

13. A method of filtering fluid including debris comprising:
    a. causing said fluid to pass through a multiplicity of filtering canisters each having a filter and aligned in series such that a given one of the filtering canisters will collect debris particles in the fluid and become filled with debris before a next filtering canister begins to function as a filtering apparatus; and
    b. removing the filter of one of the filtering canisters in the series which has become filled with debris while enabling the filtering to continue through the remaining filtering canisters without stopping the filtering process.

14. The method in accordance with claim 13 further comprising automatic and continuous shifting of a balance between positive pressure pushing the fluid onto the filter of each filtering canister and negative pressure pulling the fluid away from the filter of each filtering canister, such that when the filter of said first filtering canister is clean, the positive pressure pushing the fluid onto the filter exceeds the negative pressure and as the filter becomes clogged with debris, the negative pressure exceeds the positive pressure and causes the fluid to travel to the filter of the filtering canister next in the series.

15. The method in accordance with claim 14, wherein the negative pressure pulling the fluid away from the filter in each filtering canister loosens the debris formed on each filter so that the channels of flow are created to allow the fluid to reach to the filter whose pores are not completely clogged.

16. A method of filtering fluid including debris comprising:
    a. causing said fluid to pass through a multiplicity of filtering canisters each having a filter and aligned in series such that a given one of the filtering canisters will collect debris particles in the fluid and become filled with debris before a next filtering canister begins to function as a filtering apparatus; and
    b. replacing the filter of one of the filtering canisters in the series which has become filled with debris while enabling the filtering to continue through the remaining filtering canisters without stopping the filtering process.

17. The method in accordance with claim 16 further comprising automatic and continuous shifting of a balance between positive pressure pushing the fluid onto the filter of each filtering canister and negative pressure pulling the fluid away from the filter of each filtering canister, such that when the filter of said first filtering canister is clean, the positive pressure pushing the fluid onto the filter exceeds the negative pressure and as the filter becomes clogged with debris, the negative pressure exceeds the positive pressure and causes the fluid to travel to the filter of the filtering canister next in the series.

18. The method in accordance with claim 17, wherein the negative pressure pulling the fluid away from the filter in each filtering canister loosens the debris formed on each filter so that the channels of flow are created to allow the fluid to reach to the filter whose pores are not completely clogged.

* * * * *